United States Patent [19]
Hatch et al.

[11] Patent Number: 5,244,412
[45] Date of Patent: Sep. 14, 1993

[54] ELECTRICAL DEVICE FOR SURFACE MOUNTING ON A CIRCUIT BOARD AND MOUNTING COMPONENT THEREOF

[75] Inventors: David Hatch, Seven Valleys; Mervin Fair, Glen Rock, both of Pa.; Louis Csanko, Yonkers, N.Y.; Don McClune; Jeff Fleming, both of York, Pa.

[73] Assignee: Stewart Connector Systems, Inc., Glenrock, Pa.

[21] Appl. No.: 814,416

[22] Filed: Dec. 24, 1991

[51] Int. Cl.[5] ............................................. H01R 23/72
[52] U.S. Cl. ................................. 439/567; 411/456; 439/79; 439/571; 439/676
[58] Field of Search ............... 411/340, 341, 342, 347, 411/352, 451, 456, 508, 509, 510, 511, 906, 908, 913, 922; 439/552, 554, 557, 567, 569, 570, 571, 572, 573, 79, 676

[56] References Cited

U.S. PATENT DOCUMENTS

| | | | |
|---|---|---|---|
| 429,118 | 6/1890 | Durell | 411/451 |
| 2,614,450 | 10/1952 | Oltz et al. | 411/456 |
| 4,195,900 | 4/1980 | Hughes | 411/508 |
| 4,655,517 | 4/1987 | Bryce | 411/510 |
| 4,728,238 | 3/1988 | Chisholm et al. | 411/510 |
| 4,907,987 | 3/1990 | Douty et al. | 439/555 |
| 5,049,018 | 9/1991 | Murphy | 411/913 |
| 5,120,257 | 6/1992 | Hahn | 439/82 |

Primary Examiner—Neil Abrams
Attorney, Agent, or Firm—Steinberg & Raskin

[57] ABSTRACT

An electrical device for surface mounting on a circuit board comprises a housing and a plurality of contacts wherein the distance between the region at which the pad-engaging portion of each contact engages its respective pad, and the region of the fulcrum about which the contact deflects, is maximized to reduce the magnitude of the biasing force resulting from the deflection. An improved mounting component for the device comprises a post having tangs that extend from its side which are deflected to allow the post to be inserted into the board opening and which skive into the sides of the opening to prevent the post from retraction therefrom. An improved positioning arrangement for the device comprises a pair of positioning posts having polygonal cross-sections, each having a maximum cross-sectional dimension in single, mutually orthogonal, directions.

6 Claims, 7 Drawing Sheets

ELECTRICAL DEVICE FOR SURFACE MOUNTING ON A CIRCUIT BOARD AND MOUNTING COMPONENT THEREOF

BACKGROUND OF THE INVENTION

The present invention relates generally to improvements in electrical devices intended for surface mounting on printed circuit boards and in the mounting components thereof.

Electrical devices adapted to be mounted to the surface of printed circuit boards are conventional. Circuit boards on which such electrical devices are surface mounted are provided with terminal pads or areas which form part of the printed circuits, and the devices are provided with contacts or leads having pad-engaging portions which are configured and positioned to be placed in overlying alignment with the terminal pads. Generally, the pads are coated with a solder paste composition and, after the pad-engaging contact portions are placed into engagement with appropriate terminal pads, the solder composition is reflowed to thereby obtain a secure electrical engagement between each contact portion and its respective terminal pad. Connector devices are also mechanically connected to the boards, generally by mounting posts that are inserted into corresponding openings formed in the board until their barbed or hooked ends snap into engagement with the underside of the board.

Since the terminal pads on the board are coplanar, it would be advantageous if the pad-engaging contact portions of the surface mounted device were also precisely coplanar so that all the contact portions could be placed into electrical engagement with the terminal pads without having to deflect or flex one or more of the contacts to bring the other contact portions into engagement with the terminal pads. However, this is not possible to accomplish on a production basis so that in practice, one or more of the contacts must be deflected to some extent in order to bring all the contact portions into electrical engagement with their corresponding terminal pads. The unavoidable deflection of one or more of the contacts in assembling a surface mounted device to a printed circuit board results in a biasing force being built into the assembly which tends to separate the device from the board and cause the integrity of the soldered electrical connections to degrade.

Moreover, conventional mounting posts used to mechanically connect devices to printed circuit boards present problems. In the case of surface mount applications, when the hooked ends of the mounting posts of a board-mounted device snaps into engagement with the underside of the board, the impact may cause hundreds of small components that are laying in the solder paste prior to the surface mount soldering process to be jarred from their pads. In both surface and pin mount applications, the mounting posts must be specially sized for each application, having an appropriate diameter corresponding to the diameter of the opening in the printed circuit board, and a length corresponding to the board thickness.

SUMMARY OF THE INVENTION

Accordingly, it is an object of the present invention to provide new and improved electrical devices for surface mounting to circuit boards.

Another object of the invention is to provide new and improved electrical devices for surface mounting on circuit boards in which the biasing force resulting from the deflection of one or more of the leads or contacts during the surface mounting procedure is minimized.

Still another object of the invention is to provide new and improved mounting components for board-mounted devices.

A further object of the invention is to provide new and improved mounting components for board mounted devices which allow a smooth, low impact connection of the device to the board while achieving high retention in a range of hole sizes and printed circuit board thicknesses.

Briefly, in accordance with the present invention, these and other objects are attained by providing an improved construction wherein the distance between the region at which the pad-engaging contact portion of each contact engages its respective pad, and the region of the fulcrum about which the contact deflects is maximized to thereby reduce the magnitude of the biasing force resulting from the deflection. With a shorter distance between the pad-engaging contact portion and the bending point of the contact, as is conventional, a greater biasing force will result from the same degree of deflection of the contact and, in some cases, the bending point or fulcrum of the contact is so close to the pad-engaging contact portion that even a small deflection of the contacts results in large biasing forces tending to separate the device from the board.

Further in accordance with the invention, the above-stated objects, among others, are attained by providing an improved construction for a mounting component of board mounted devices comprising a post depending from the device having tangs that extend from its side which are deflected to allow the post to be inserted into the board opening, and which skive into the sides of the opening to prevent the post from retracting therefrom. In a preferred form, the mounting component comprises a post having a through-slot into which a clip formed of a resilient metallic material is inserted and affixed. The clip is configured so that its ends protrude beyond the profile of the post upwardly away from the direction of insertion of the post into the board opening. The clip ends are deflected inwardly as the post is inserted into the hole in the board and skive into the sides of the hole to achieve a high degree of retention. The construction allows a post having a particular length and diameter to effectively connect the device to boards of different thicknesses and hole sizes in a smooth, low impact operation which will not jostle other electrical devices positioned on the board.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
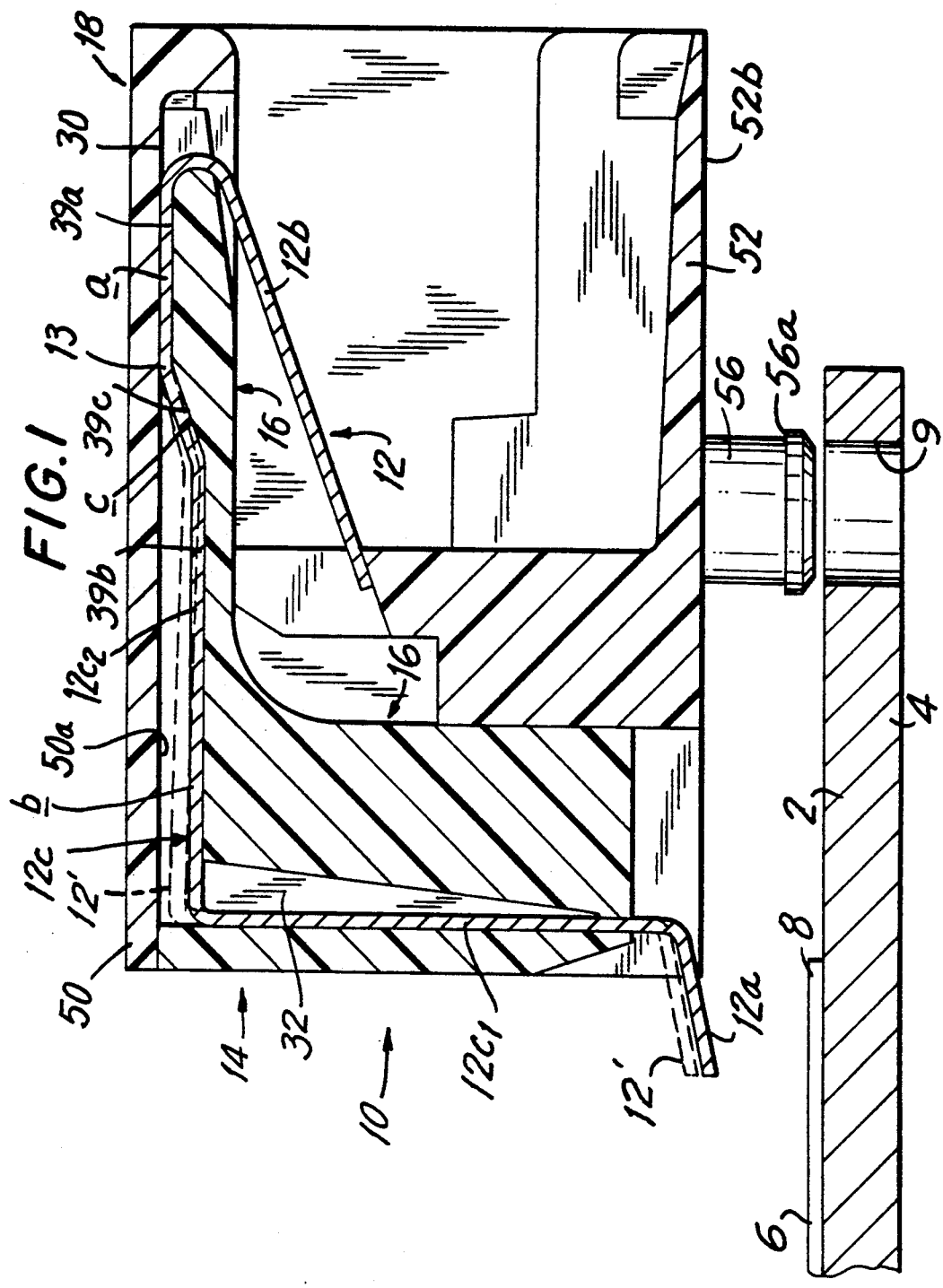
FIG. 1 is a cross-sectional view of a connector constructed in accordance with on aspect of the invention which is spaced from the mounting surface of a circuit board.

Referring now to FIGS. 1-6 of the drawings wherein like reference characters designate identical or corresponding parts throughout the several views, an embodiment of a device in accordance with the present invention, in the form of a jack connector 10 adapted to be coupled to a modular-type plug connector, is constructed of a plurality of conductive contacts 12 (only one shown) and a housing 14 formed of an insulative material, such as plastic, including a first inner housing part 16 and a second outer housing part 18. The connector 10 is similar in several respects to that disclosed in U.S. Pat. No. 4,875,863, the disclosure of which is incorporated herein by reference, which is adapted to be connected to a printed circuit board by contact pins inserted into holes in a printed circuit board.

FIG. 1 shows the connector 10 positioned above the mounting surface 2 of a circuit board 4 in preparation for mounting the connector to the circuit board. The mounting surface 2 of circuit board 4 has circuit board conductors 6 which extend to terminal pads 8. The housing 14 of connector 10 has integral mounting posts 56 (only one shown) which are received in holes 9 (only one shown) in the circuit board. The mounting posts 56 as shown are conventional and include a barbed or hooked end 56a which snaps into engagement with the underside of board 4 by virtue of slots 56b (FIG. 5) formed in the posts. Pad-engaging portions 12a of contacts 12 extend from the connector housing 14 and are intended to be connected by soldering to aligned terminal pads 8. The connector is assembled to the circuit board by moving it downwardly from the position shown in FIG. 1 so that the mounting posts 56 enter the holes 9 while the pad-engaging contact portions 12a are located against the terminal pads 8. The terminal pads 8 are coated with a solder paste composition which is then reflowed to establish a bond between the pad-engaging contact portions 12a and the terminal pads 8.

During the surface mounting process, one or more of the contact portions 12a will be pressed against respective terminal pads 8 so that the respective contacts 12 are deflected or bent to some degree until all of the pad-engaging contact portions engage respective terminal pads. In other words, the contact whose contact portion 12a is the first to engage a terminal pad 8 during the assembly process, will bend or flex to a greater degree than the other contacts. It is an object of the invention to reduce the biasing force which results from such deflection of the contacts to thereby minimize the tendency of the connector to separate from the circuit board and improve the integrity of the electrical connection.

As best seen in FIG. 1, each contact 12 is formed of suitable conductive material, such as phosphor bronze, and includes the pad-engaging portion 12a, a mating contact portion 12b adapted to mate with corresponding contacts of a plug, and a substantially L-shaped intermediate portion 12c including a first leg $12c_1$, and a second leg $12c_2$. The pad-engaging contact portion 12a extends from the end of the first leg $12c_1$, of the intermediate L-shaped contact portion, while the mating contact portion 12b extends from the end of the second leg $12c_2$ of the L-shaped contact portion. In accordance with the invention, the connector is constructed such that in the case that the pad-engaging portion 12a of contact 12 engages the terminal pad 8 during the mounting procedure such that deflection of the contact 12 occurs, the contact 12 is deflected about a fulcrum or bending point 13 located on the second leg $12c_2$ of the intermediate contact portion 12c which is remote and at a substantial distance from the pad-engaging contact portion 12a to thereby minimize the resulting biasing force between the connector and the printed circuit board.

The connector of the illustrated embodiment includes six contacts 12, three of which have longer second legs $12c_2$ than the other three with which they alternate in order to provide a higher density of electrical connections as will be understood by those skilled in the art. In other respects, the construction of the contacts 12 are identical.

As noted above, the connector housing 14 is formed of two parts, namely, a first inner housing part 16 and a second outer housing part 18. The inner housing part 16 is inserted within the outer housing part 18 and is lockingly interfit therewith, after pre-assembly of the contacts 12 with the inner housing part 16, to thereby capture the contacts 12 between them, the contacts thereby being completely enclosed within the housing (except for the pad-engaging portions 12a) and precisely located to engage corresponding contacts of a mating plug connector.

Figure 3:
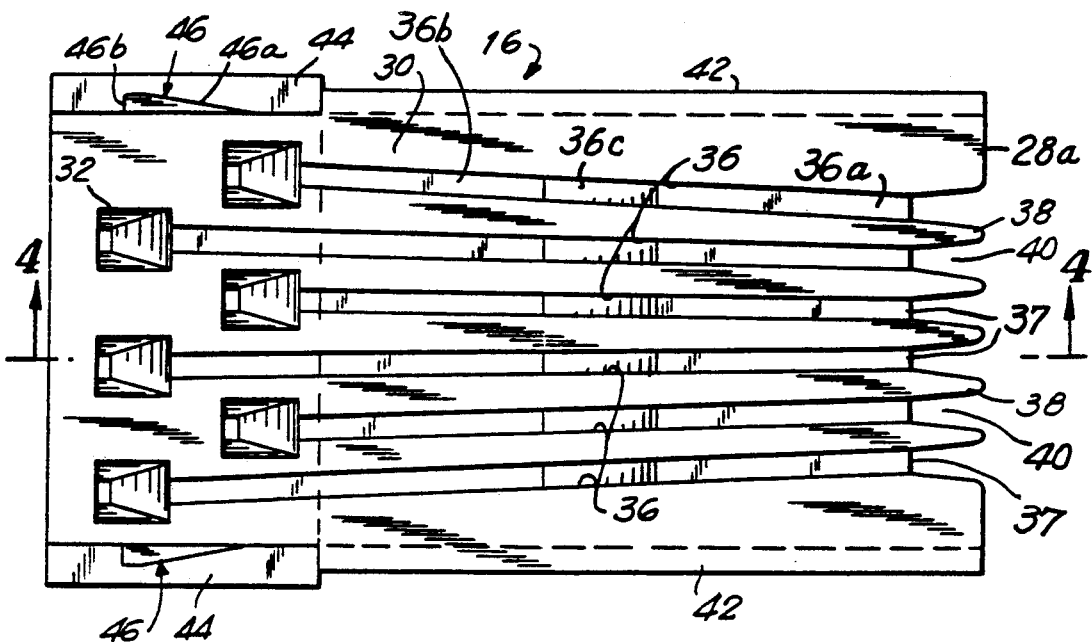
FIG. 3 is a top plan view of an inner housing part of the connector of FIG. 1.
Figure 4:
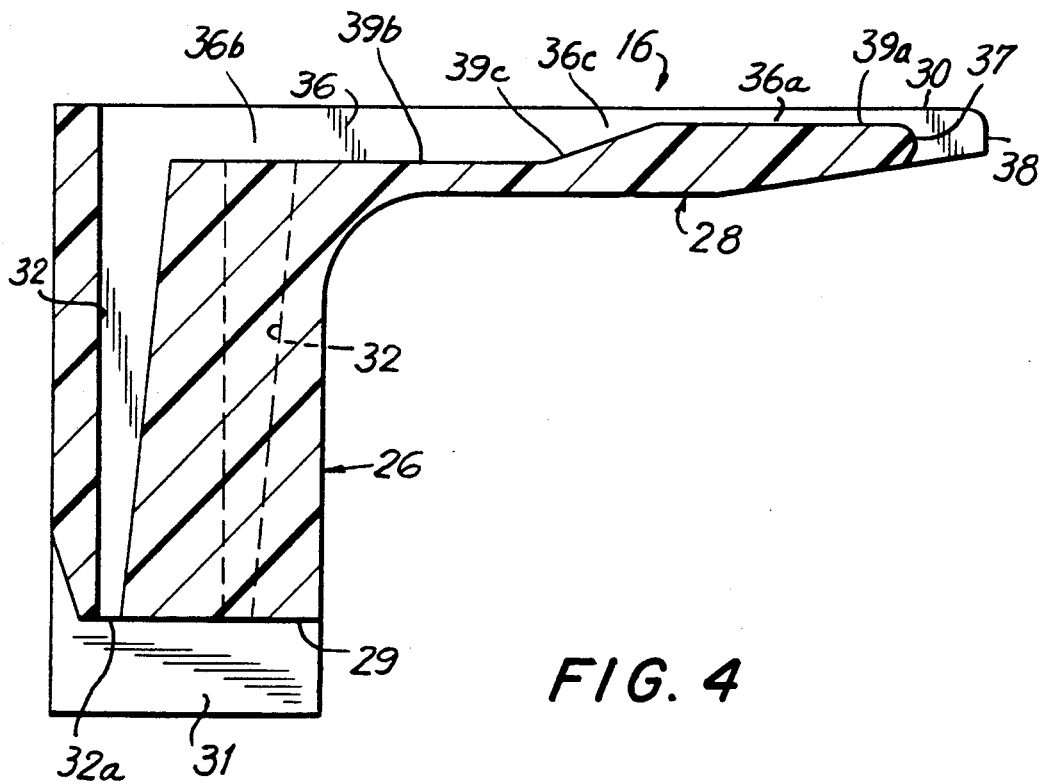
FIG. 4 is a section view taken along line 4—4 of FIG. 3.

Referring to FIGS. 3 and 4, the inner housing part 16 is formed of suitable plastic material and has a substantially L-shaped configuration including a back portion 26 and a guide portion 28 extending from the top of the back portion 26 in a cantilever fashion. Back portion 26 has a bottom surface 29 best seen in FIG. 4 from which a pair of end walls 31 depend. The back and guide portions 26 and 28 have a common top surface 30. A plurality of substantially vertical, parallel bores 32 are formed through the back portion 26, the number of bores 32 corresponding to the number of contacts 12. Each bore 32 extends throughout the entire height of the back portion 26 opening onto the top surface 30 and the recessed bottom surface 29 thereof, and has a downwardly tapering cross-section best seen in FIG. 4. The bottom ends 32a of the bores form a pattern which conforms to the pattern of the terminal pads of the printed circuit board to which the connector is to be mounted.

A plurality of substantially parallel guide slots or channels 36 are formed in the top surface 30 of guide portion 28, each channel 36 opening at its rearward end into the top of a respective one of the bores 32 and terminating at its forward end 37 which is recessed rearwardly of the forward edge 28a of the guide portion 28. Fingers 38 project forwardly from the guide portion 28 separating the forward ends 37 of adjacent guide channels 36.

Each channel 36 has substantially the same width as the width of a contact 12 and includes a shallow forward portion 36a, a deeper rearward portion 36b and a relatively short intermediate portion 36c of increasing depth interconnecting the shallow forward and deep rearward channel portions. The forward channel portion 36a defined by bottom wall 39a parallel to top surface 30 has a depth which is substantially the same as the height or thickness of contact 12. On the other hand, the depth of the rearward channel portion 36b defined by bottom wall 39b parallel to top surface 30 is greater than the height or thickness of the contact. The intermediate channel portion 36c is defined by a downwardly and rearwardly extending bottom wall 39c interconnecting the bottom walls of the forward and rearward channel portions 36a and 36b.

Means are provided on the first inner housing part 16 for facilitating the assembly of the same to the second outer housing part 18 and locking the housing parts to each other. In particular, a pair of upper rails 42 are provided along the lateral sides of the guide portion 28 while a pair of lower rails 44 parallel to upper rails 42 are provided along the lateral sides of back portion 26. A pair of locking projections 46 are also formed on the lateral sides of back portion 26 above respective lower rails 44, each locking projection including a camming surface 46a and a rearwardly facing vertical locking surface 46b.

Figure 2:
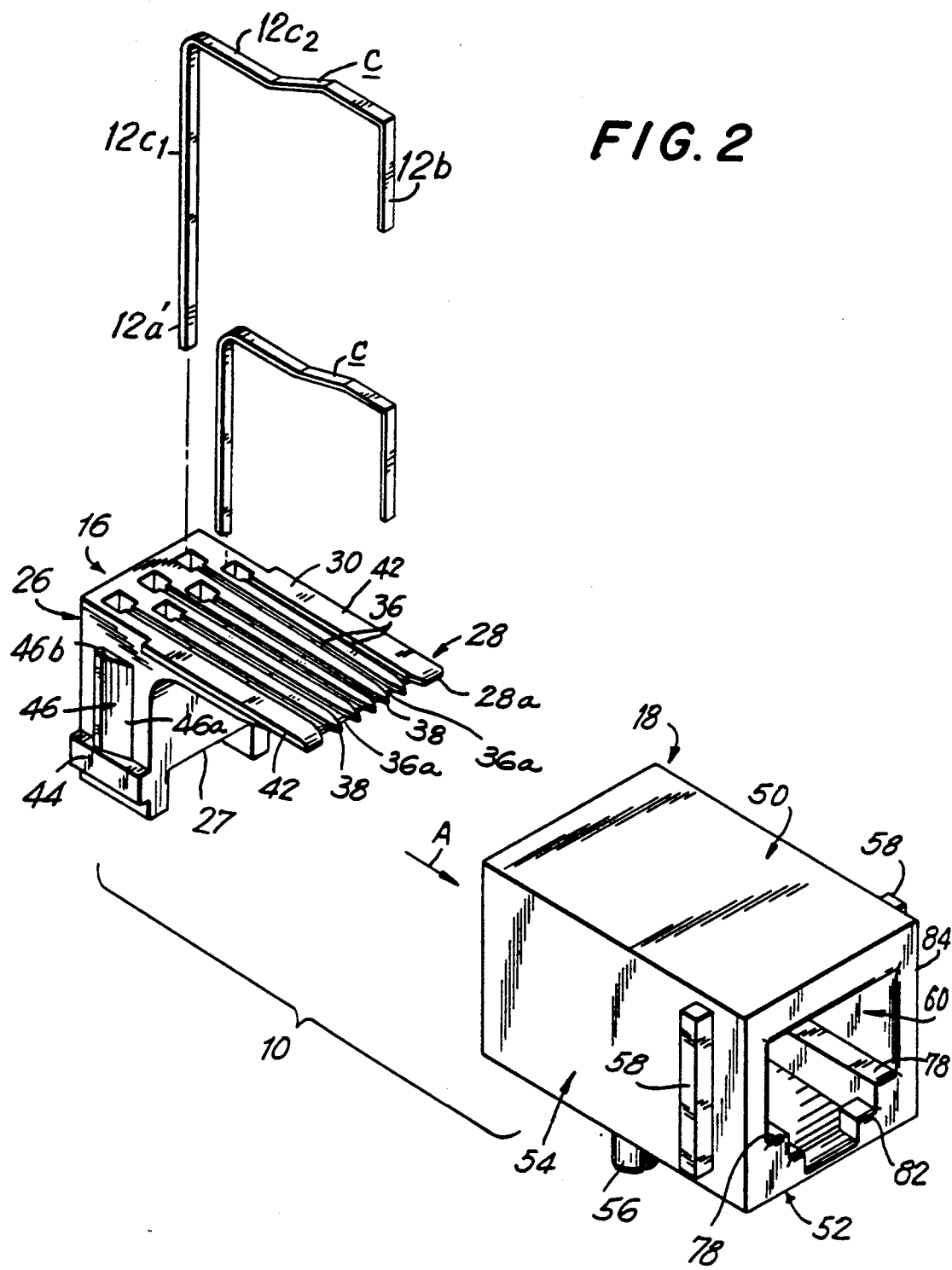
FIG. 2 is an exploded perspective view of the connector of FIG. 1.
Figure 5:
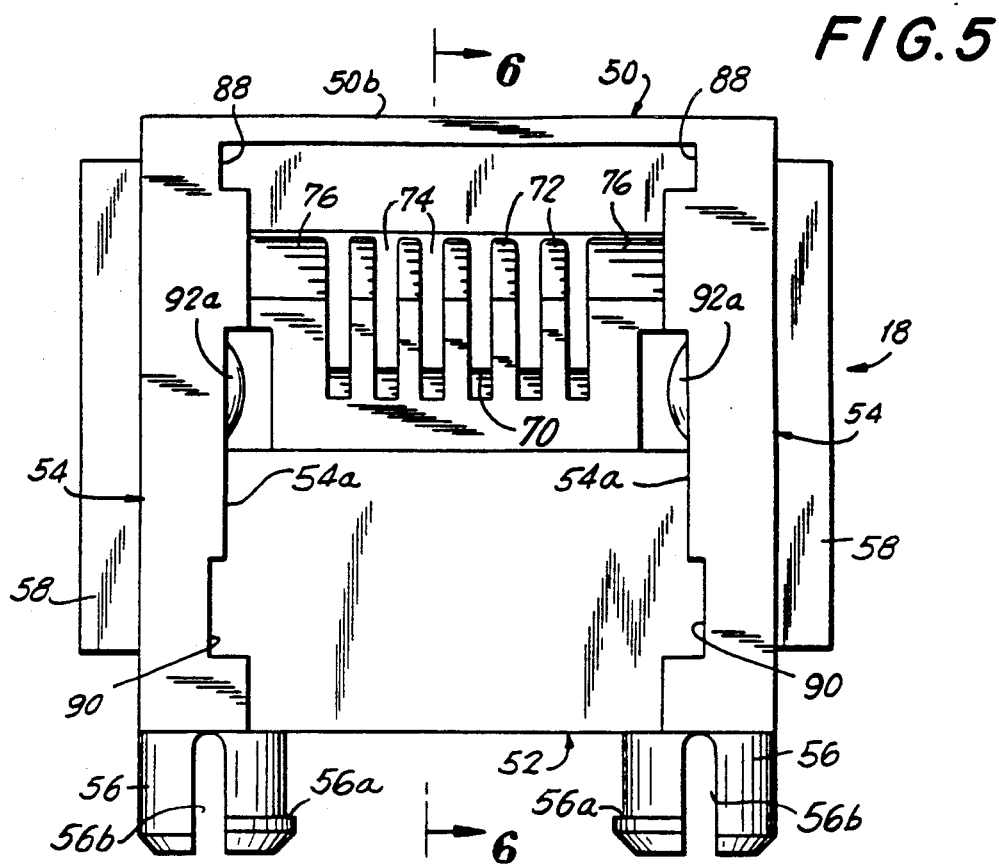
FIG. 5 is a rear elevation view of an outer housing part of the connector of FIG. 1.
Figure 6:
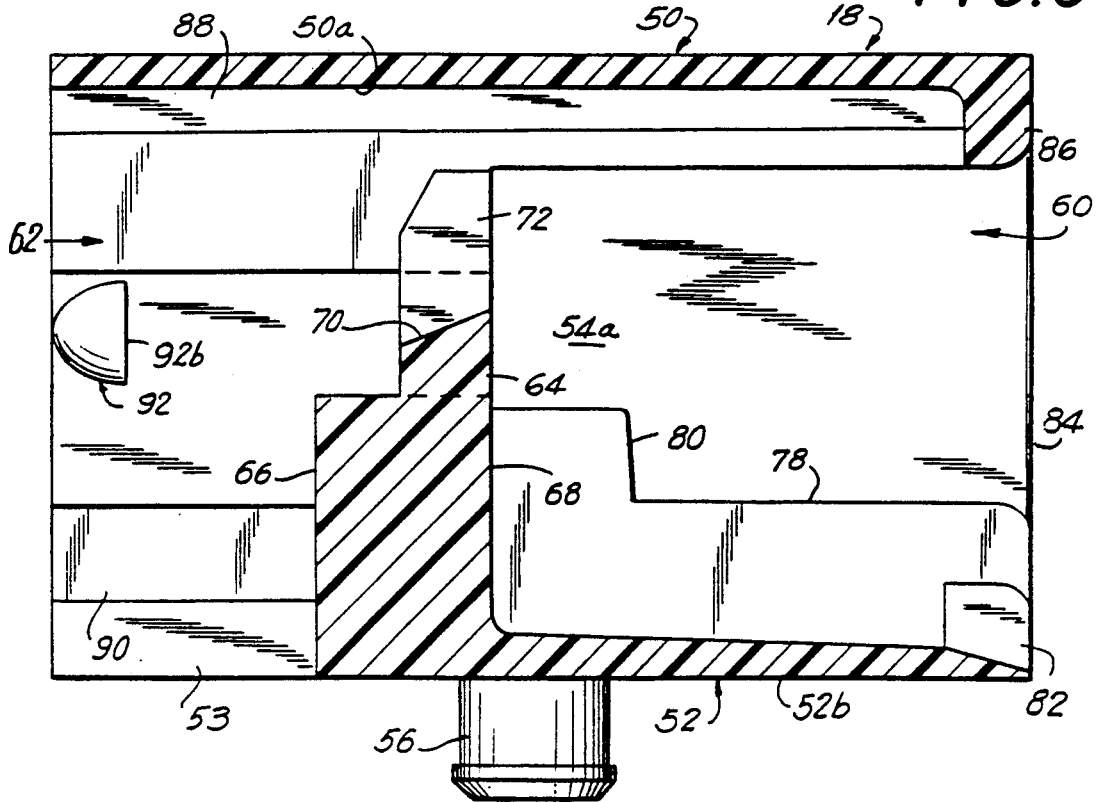
FIG. 6 is a section view taken along line 6—6 of FIG. 5.

Referring now to FIGS. 2, 5 and 6, the outer housing part 18 comprises a unitary molded plastic member having a substantially rectangular shape formed by opposed top and bottom walls 50 and 52 and opposed side walls 54 defining an interior space between them. The inner and outer surfaces of the respective walls are designated by corresponding reference numerals followed by the suffixes "a" and "b" respectively. Bottom wall 52 has a rectangular cutout 53 which opens onto the rearward end 55 of housing part 18. The posts 56 project downwardly from bottom wall 52 for connecting the connector to the printed circuit board as described above. A pair of flanges 58 project laterally from side walls 54 for facilitating mounting of the connector to a chassis, if desired.

The interior of the housing part 18 is divided by a wall 64 into a forward plug receptacle 60 and a rearward space 62 (FIG. 6) for receiving the back portion 26 of the inner housing part 16 with the guide portion 28 extending between both spaces 60 and 62. The wall 64 projects upwardly from bottom wall 52 and has a rear surface 66, a front surface 68 and a top surface 70 which is angled upwardly in the forward direction as best seen in FIG. 6. The distance between the rear surface 66 of wall 64 and the rear end 55 of the housing part 18 is essentially equal to the longitudinal dimension of the back portion 26 of inner housing part 16. The distance between the plane of the outer surface 52b of bottom wall 52 and the inner surface 50a of top wall 50 is substantially equal to the height dimension of the inner housing part 16. A comb-like structure comprising a plurality of longitudinally extending, spaced partitions 72 project upwardly from the top surface 70 of wall 64 and define a corresponding number of guide slots 74 together with a pair of outermost walls 76 situated at respective lateral sides of the wall 64. Upon assembly of the connector, the guide slots 74 are aligned with the forward edges 37 of guide channels 36 of the inner housing part 16.

A pair of longitudinally extending shoulders 78 terminating at abutment surfaces 80 project inwardly from the inner surfaces 54a and sidewalls 54 within receptacle space 60 for engaging a conventional modular connector when the latter is inserted into the receptacle 60. In this connection, a pair of spaced lips 82 project upwardly from the bottom wall 52 at the opening at the front end 84 of the outer housing part 18. These lips constitute locking surfaces for the locking tab of a modular plug connector, as is conventional. A lip 86 projects downwardly from the top wall 50 at the front end 84 of housing part 18.

A pair of upper channels 88 are formed in the inner surfaces 54a of side walls 54 immediately below the top wall 50 for receiving the upper rails 42 of the guide portion 28 of inner housing part 16. Upper rails 42 extend from the rear end 55 of the outer housing part 18 to the inner side of lip 86 at the forward end 84 of housing part 18. A pair of lower channels 90 are formed in the inner surfaces 54a of sidewalls 54 extending from the rear housing part end 55 up to the rear surface 56 of separating wall 64. The lower channels 90 receive the lower rails 44 of inner housing part 16 upon assembly. A pair of locking projections 92 are formed on the inner surfaces 54a of side walls 54 and each includes a camming surface 92a and a forwardly facing locking surface 92b adapted to lockingly engage the locking surfaces 46b of locking projections 46 upon assembly as described below.

Referring to FIG. 2 in conjunction with FIGS. 1 and 3–6, the assembly of the connector 10 will now be described. The contacts 12 are initially preformed to the shape illustrated in FIG. 2, i.e., the first and second legs $12c_1$ and $12c_2$ are bent at right angles to each other. The second leg $12c_2$ is formed to include an inclined midportion c shaped to conform to the bottom wall 39c of channel 36, and forward and rearward portions a and b shaped to conform to the bottom walls 39a and 39b of channel 36. The mating contact portion 12b is bent at right angles to the second leg $12c_2$. Prior to bending the end portion 12a' of the contact corresponding to the pad-engaging portion 12a, the colinear contact portions 12a', $12c_1$ of each contact are inserted into a respective bore 32 so that the end portion 12a' of the contact corresponding to the pad-engaging portion 12a projects below the bottom surface 29 of the back portion 26 and so that the second leg $12c_2$ of the contact is received in a corresponding guide channel 36 as seen in FIG. 1. The second leg $12c_2$ of the contact 12 is supported along its entire length (except where it extends over the open top of the bore 32) by the bottom wall portions 39a, 39b and 39c of guide channel 36. The forward end portions of each contact corresponding to mating contact portion 12b pass over the forward edges 37 of guide channels 36. As discussed above, the dimensions of the guide channels 36 and contacts 12 are such that the exposed upper surfaces of the forward portion a of the second leg $12c_2$ of the contact which rests upon the bottom wall $39a$ of the shallow portion $36a$ of guide channel 36 is substantially flush with the upper surface 30 of the inner housing part 16. On the other hand, substantial space is provided above the rearward portion b of the second leg $12c_2$ which is supported on the bottom wall $39b$ of the deep portion $36b$ of guide channel 36. The pad-engaging contact portions $12a$ are bent with respect to the first legs $12c_1$, of the L-shaped contact portion to the shape shown in FIG. 1.

The sub-assembly of the inner housing part 16 and contacts 12 is then inserted into the rearward space 62 within outer housing part 18 in the direction of arrow A of FIG. 2 with the upper and lower rails 42 and 44 being received in the upper and lower channels 88 and 90. During insertion, the mating contact portions $12b$ are aligned with respective ones of the guide slots 74 formed between partitions 72 and engage the surface 70 whereby the mating contact portions $12b$ are bent into the shape shown in FIG. 1 as insertion continues. The camming surfaces $46a$, $92a$, of locking projections 46, 92 engage each other until the locking surfaces $46b$, $92b$ snap into engagement whereupon the inner and outer housing parts become locked to each other. When insertion has been completed, the end region of each mating contact portion $12b$ bears with a spring force against the top surface 70. Partitions 72 prevent the contacts 12 from contacting each other during operation.

As seen in FIG. 1, the inner surface $50a$ of the top wall 50 of the outer housing part 18 bears against the top surface 30 of the inner housing part 16. At the same time, the inner surface $50a$ of top wall 50 of the outer housing part bears against the top surfaces of the forward portions a of the second legs $12c_2$ of the contacts 12 from their forward ends up to a point 13 at which the inclined contact portions c begin to extend downwardly away from top wall 50 and along the bottom wall $39c$ of guide channel 36. The inner surface $50a$ of the top wall 50 of the outer housing part 18 is spaced from the top surfaces of the rearward portions b of the second legs $12c_2$ as best seen in FIG. 1.

Thus, the forward portion a of the second leg $12c_2$ of each contact 12 is clamped between the inner surface $50a$ of top wall 50 of the outer housing part and the bottom wall $39a$ of the guide channel 36. However, the rearward and inclined portions b and c of the second leg $12c_2$ of the contact are free to move within the space defined between the inner surface $50a$ of the top wall 50 and the bottom wall portions $39b$ and $39c$ of guide channel 36 with respect to the fulcrum or bending point 13. Still referring to FIG. 1, in mounting the connector 10 on the printed circuit board 4, the connector is lowered until the outer surface $52b$ of the bottom wall 52 of the outer housing part is contiguous with the mounting surface 2 of the printed circuit board 4, with the mounting posts 56 being received within openings 9 and the pad-engaging contact portions $12a$ engaging the terminal pads 8. As the pad-engaging contact portions $12a$ engage the terminal pad 8, one or more of the contacts 12 will deflect to the dotted line position $12'$ illustrated in FIG. 1 with respect to the fulcrum or bending point 13. It is clear from FIG. 1 that the fulcrum 13 is remote and spaced a relatively large distance from the pad-engaging portion $12a$ of contact 12 so that the biasing force set up in the contact is relatively small. It will also be understood from FIG. 1 that a contact 12 may be deflected to an even greater extent then that illustrated so long as clearance exists between the second leg $12c_2$ of contact 12 and the inner surface $50a$ of the top wall of the outer housing part.

Figure 7:
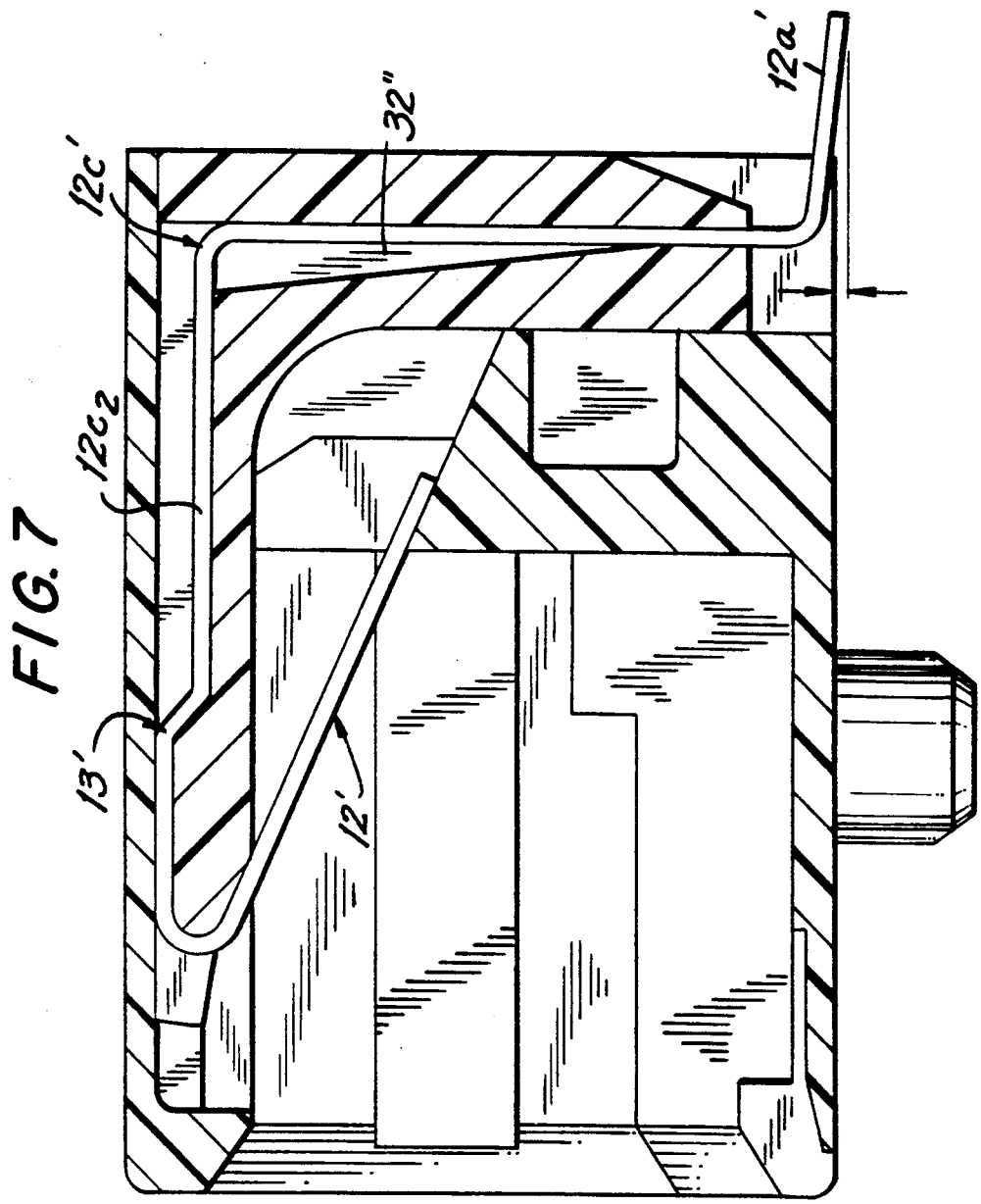
FIG. 7 is a cross-sectional view similar to FIG. 1 of another embodiment of a connector constructed in accordance with one aspect of the invention.

Referring now to FIG. 7, another embodiment of a surface mounted connector in accordance with the invention is illustrated and parts thereof corresponding to similar parts of the connector illustrated in FIGS. 1-6 are designated by the same reference numeral, primed. The essential difference between the connector illustrated in FIG. 7 and the one illustrated in FIGS. 1-6 is that only a single row of bores $32'$ are provided through the back portion $26'$ of the inner housing part $16'$. The design is similar to the one illustrated in FIGS. 1-6 in the essential feature that the fulcrum or bending point $13'$ of contact $12'$ is situated on the second leg $12c_2'$ of the intermediate contact portion $12c'$ substantially remote from the position of the pad-engaging contact portion $12a'$.

Figure 8:
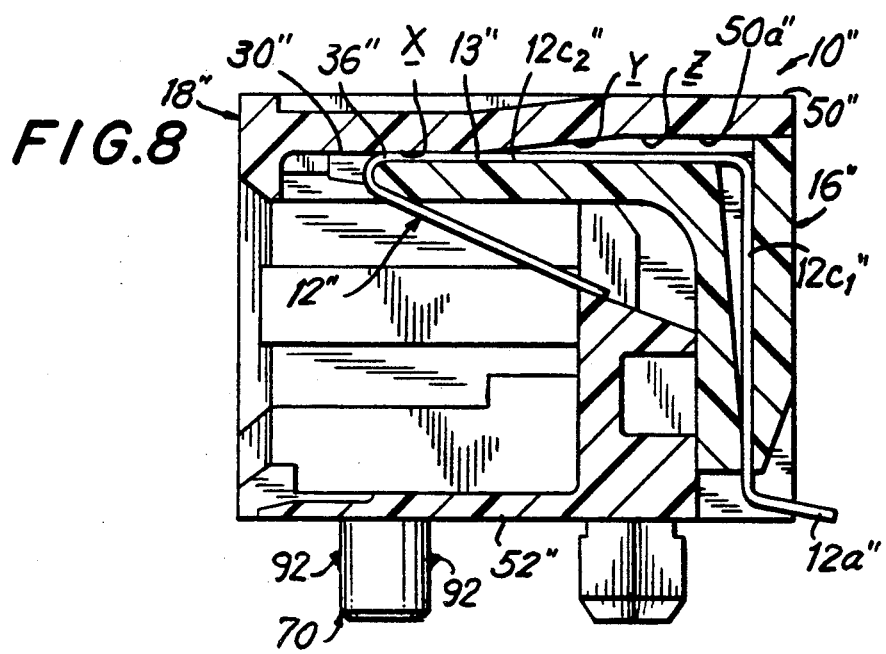
FIG. 8 is a cross-sectional view similar to FIG. 1 of a third embodiment of a connector constructed in accordance with one aspect of the invention and also provided with improved mounting components in accordance with another aspect of the invention.
Figure 9:
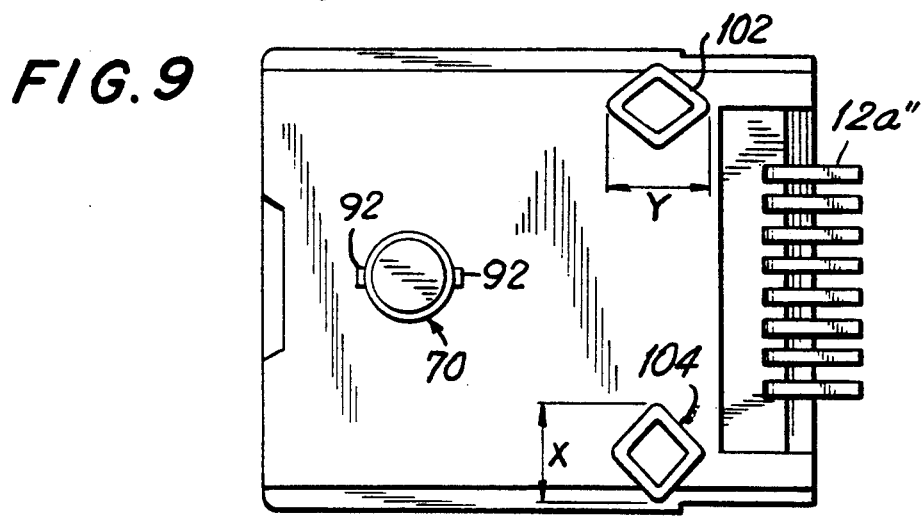
FIG. 9 is a bottom plan view of the connector of FIG. 8.
Figure 10:
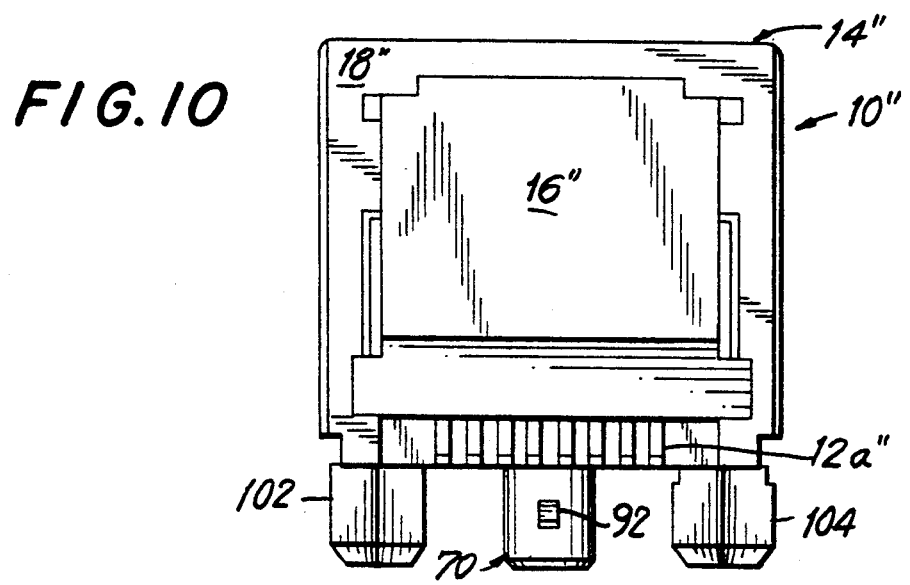
FIG. 10 is a rear elevation view of the connector of FIG. 8.

Referring now to FIGS. 8-10, a third embodiment of a connector intended to be surface mounted on a printed circuit board is illustrated. The construction of this connector is similar to the first and second embodiments illustrated in FIGS. 1 and 7 and corresponding components are designated by the same reference characters, double primed. The construction differs in the constructional arrangement for positioning the fulcrum point around which the contact deflects at a maximum distance from the pad-engaging contact portion, and in that improved components for mounting the connector on the board are provided.

Unlike the embodiments of the invention discussed above, in the construction of connector $10''$ the guide channels $36''$ formed in the top surface $30''$ of the inner housing part $16''$ are of uniform depth, substantially equal to the thickness of the contacts $12''$. On the other hand, the inner surface $50a''$ of the top wall $50''$ of the outer housing part $18''$ includes a first portion X which overlies and abuts against forward portions of the second legs $12c_2''$ of contacts 12, a second rearwardly and upwardly inclined portion Y which gradually departs from the upper surface of the contacts, and a third portion Z extending parallel to the portion X of inner wall $50a''$ and which is spaced from the upper surfaces of contacts $12''$. As seen in FIG. 8, the second legs $12c_2''$ of contacts $12'$ are essentially linear and do not include the inclined ramp portions as in the contacts of the embodiments of FIGS. 1 and 7. In the case of the embodiment of FIGS. 8-11, the fulcrum or bending points $13''$ of contacts 12 are defined at the points at which the inner surface $50a''$ of the top wall $50''$ of the outer housing part disengages the upper surfaces of contacts $12''$, i.e. at the intersection of the inclined and first wall portions Y and X of the inner surface $50a''$ of top wall $50''$. As in the case of the previously discussed embodiments, the fulcrum or bending points $13''$ of contacts $12''$ are remote and substantially spaced from the pad-engaging contact portions $12a''$ so that when one or more of the contacts are deflected upon mounting to the surface of the printed circuit board, only a relatively small biasing force will be created.

It will be understood from the foregoing that the aspect of the invention described above is not limited to the particular embodiments disclosed. For example, although it is preferred that the contacts be fully enclosed within the housing in the manner shown, such as by providing that the top wall of the outer housing part overlie the second leg of the contact while the first leg passes through bores formed in the inner part of the housing, it is possible to implement the invention without these features so long as the fulcrum or bending points of the contacts are located on the second legs of the contacts at a position substantially spaced and remote from the pad-engaging contact portions.

Figure 11:
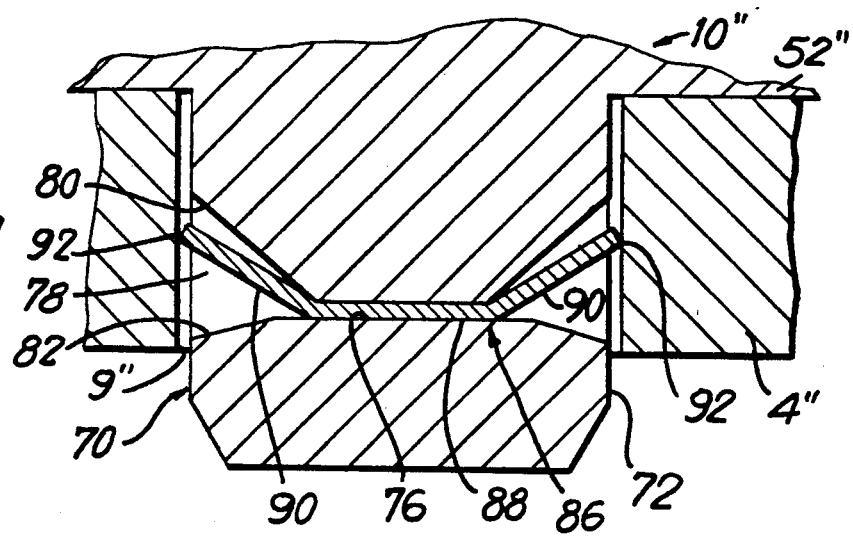
FIG. 11 is a cross-sectional view illustrating a mounting component assembly inserted in a corresponding hole in a printed circuit board in accordance with the invention.
Figure 13:
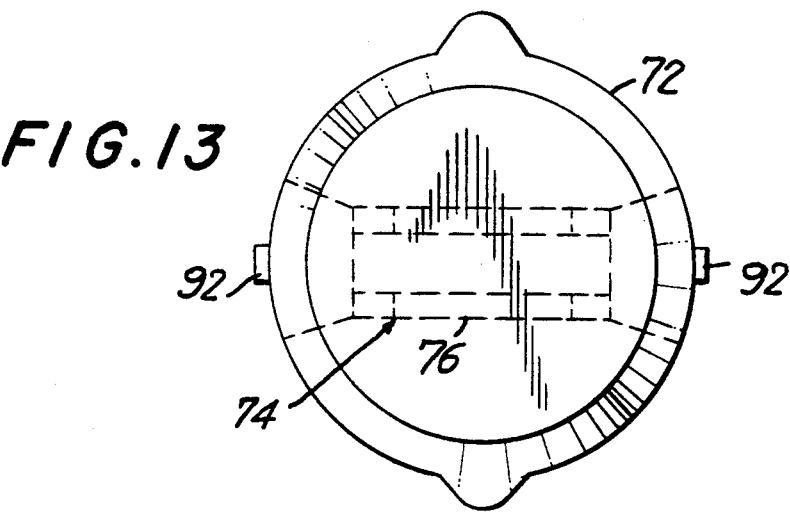
FIG. 13 is a bottom plan view of the mounting post assembly of FIG. 12.
Figure 12:
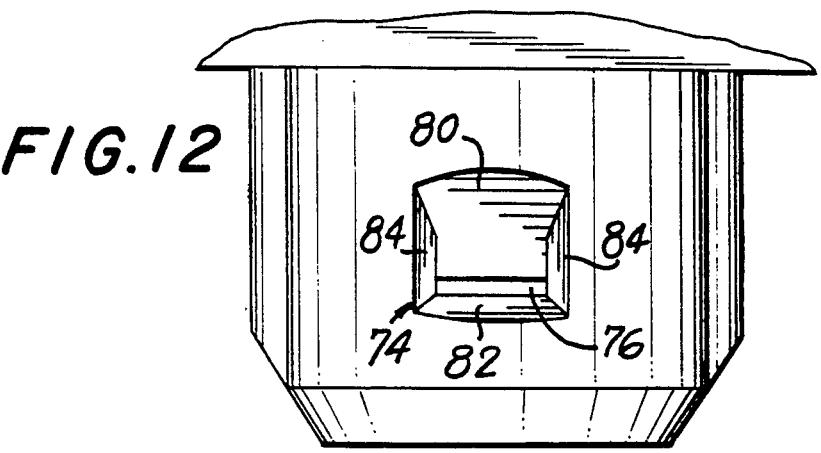
FIG. 12 is a side elevation view of the mounting post of the assembly of FIG. 12.

The connector 10" shown in FIGS. 8-10 is, according to another aspect of the invention, provided with a mounting component 70 which allows a smooth, low impact, high retention connection of the connector 10" to a printed circuit board in a range of hole sizes and board thickness. Referring to FIGS. 8-10 in conjunction with FIGS. 11-13, mounting component 70 comprises a substantially cylindrical molded post 72 depending from bottom wall 52" of connector 10" through which a slot 74 is formed opening onto diametrically opposed sides of the post 72. The slot 74 comprises a narrow intermediate portion 76 and a pair of outwardly widening end portions 78, each defined by inwardly tapering upper and lower walls 80 and 82 and side walls 84. The mounting component 70 further includes a clip 86 comprising a thin piece of sheet metal having a substantially rectangular shape and a thickness substantially equal to the width of the narrow intermediate slot portion 76 positioned within slot 74. As seen in FIG. 11, the clip 86 is shaped to include an intermediate portion 88 situated in the intermediate portion 76 of slot 74, and a pair of end portions 90 extending upwardly towards the bottom wall 52" of the housing of connector 10". The clip end portions 90 of clip 86 extend through the slot end portions 78 and terminate beyond the profile of post 72 at ends 92. The upwardly directed, protruding ends 92 of clip 86 thus form tangs that extend from the sides of post 72.

In operation, as the post 72 is inserted into an opening 9" of a circuit board 4" (FIG. 11), the clip ends 92 are deflected inwardly and upwardly away from the direction of insertion of the post 72 into hole 9" allowing the mounting component 70 to be smoothly received within hole 9". On the other hand, if a force is applied to the connector 10" or board 4" tending to remove the component 70 from hole 9", the clip ends 92 skive into the surface defining hole 9" providing a high degree of retention.

Since there is no snapping or high impact engagement between the mounting component and the printed circuit board, a mounting component in accordance with the invention is particularly suited for surface mounted arrangements since the other components laying in the solder paste prior to the surface mount soldering process will not be jarred from their pads. Moreover, it will be understood that since a mounting component in accordance with the invention connects to a board without engaging its underside, and the degree of deflection of the clip ends or tangs can accommodate different size board openings, the same mounting component can be used to effectively connect devices to boards of different thicknesses and hole sizes, an important advantage for both surface mount and pin mount applications. The post need not be cylindrical. For example, the post may have a square cross-section. The ends of the clip need not be bent at an upward angle prior to insertion of the post into the board opening, but may extend substantially horizontally and only be bent upwardly as the post is inserted into the board opening.

Referring to FIGS. 9 and 10, as an additional feature of the invention, the connector 10" is provided with a pair of positioning posts 102 and 104 which are configured to cooperate with corresponding openings in the board to precisely position the connector with respect to the board. In particular, each post 102, 104 has a diamond-shaped profile, the diamond shape of post 102 being elongated in the longitudinal direction while the diamond shape of post 104 is elongated in the transverse direction. The longitudinal dimension Y of post 102 and transverse dimension X of post 104 are equal to each other and slightly greater than the diameter of the board openings in which they are received so that the respective posts have interference fits with the board openings. Since the transverse dimension of post 102 and longitudinal dimension of post 104 are both smaller than the opening diameter, the posts 102 and 104 provides longitudinal and transverse datums functioning to precisely position the connector 10" with respect to the printed circuit board.

Obviously, numerous modifications and variations of the present invention are possible in the light of the above teachings. It is therefore to be understood that within the scope of the claims appended hereto, the invention may be practiced otherwise then as specifically disclosed herein.

What is claimed is:

1. A device intended to be mounted on a printed circuit board having an opening formed therethrough, comprising:

a housing and a plurality of contacts associated therewith; and at least one mounting component for mechanically connecting said device to said printed circuit board, said mounting component including a post connected at one end to said housing, said post having a maximum transverse dimension less than a maximum transverse dimension of said board opening, a slot formed through said post and opening onto substantially opposed side regions of said post, and a clip member situated in said slot, said clip member having terminal ends that protrude beyond the profile of said post, said clip ends constituting tangs, said tangs adapted to deflect upon insertion of said post into said opening in said printed circuit board, and skive into the sides of the opening to prevent removal of the post from said board opening.

2. A device as recited in claim 1 wherein said tangs extend from said post generally towards said housing.

3. A device as recited in claim 1 wherein said post is substantially cylindrical and said terminal ends of said clip member extend from said slot at substantially diametrically opposed side regions of said post.

4. A device as recited in claim 1 wherein said clip includes an intermediate portion and a pair of end portions integral with said intermediate portion and extending at an angle with respect to said intermediate portion.

5. A device as recited in claim 4 wherein said slot includes a narrow intermediate portion and a pair of outwardly widening end portions opening onto said substantially opposed side regions of said post.

6. A device as recited in claim 5 wherein said clip is formed of metallic sheet material.

* * * * *